United States Patent
Sato et al.

(10) Patent No.: US 9,190,916 B2
(45) Date of Patent: Nov. 17, 2015

(54) DC/DC CONVERTER, CONTROL CIRCUIT AND CONTROL METHOD THEREOF, POWER SUPPLY, POWER ADAPTER AND ELECTRONIC APPARATUS USING THE SAME

(71) Applicant: ROHM CO., LTD., Kyoto (JP)

(72) Inventors: Yoshinori Sato, Kyoto (JP); Satoru Nate, Kyoto (JP)

(73) Assignee: ROHM CO., LTD. (JP)

( * ) Notice: Subject to any disclaimer, the term of this patent is extended or adjusted under 35 U.S.C. 154(b) by 246 days.

(21) Appl. No.: 14/023,983

(22) Filed: Sep. 11, 2013

(65) Prior Publication Data

US 2014/0071715 A1 Mar. 13, 2014

(30) Foreign Application Priority Data

Sep. 11, 2012 (JP) ................................ 2012-199641

(51) Int. Cl.
*H02M 3/335* (2006.01)
(52) U.S. Cl.
CPC ...... *H02M 3/33515* (2013.01); *H02M 3/33507* (2013.01)
(58) Field of Classification Search
CPC ............................................. H02M 3/33515
See application file for complete search history.

(56) References Cited

U.S. PATENT DOCUMENTS

| | | | | |
|---|---|---|---|---|
| 7,511,929 B2* | 3/2009 | Hachiya | ...................... | 361/18 |
| 7,778,050 B2* | 8/2010 | Yamashita | .................. | 363/21.16 |
| 8,199,533 B2* | 6/2012 | Shimada | .................... | 363/21.01 |
| 8,625,309 B2* | 1/2014 | Kawamura | ................. | 363/21.01 |
| 9,030,849 B2* | 5/2015 | Yamashita | ................. | 363/21.12 |

FOREIGN PATENT DOCUMENTS

| | | |
|---|---|---|
| JP | 02211055 A | 8/1990 |
| JP | 09098571 A | 4/1997 |

* cited by examiner

*Primary Examiner* — Emily P Pham
(74) *Attorney, Agent, or Firm* — Cantor Colburn LLP

(57) ABSTRACT

A control circuit of a DC/DC converter includes: a pulse modulator configured to generate a pulse signal; and a driver configured to switch a switching transistor based on the pulse signal. The pulse modulator includes an on signal generator to generate an on signal. The on signal generator includes: a bottom detection comparator configured to compare a voltage of one end of an auxiliary winding with a predetermined threshold voltage and generate a bottom detection signal; a first time-out circuit configured to generate a first time-out signal asserted when the bottom detection signal is not asserted; a second time-out circuit configured to generate a second time-out signal asserted when the bottom detection signal is not asserted; and a logic part configured to generate the on signal based on the bottom detection signal, the first time-out signal and the second time-out signal.

18 Claims, 7 Drawing Sheets

DC/DC CONVERTER, CONTROL CIRCUIT AND CONTROL METHOD THEREOF, POWER SUPPLY, POWER ADAPTER AND ELECTRONIC APPARATUS USING THE SAME

CROSS-REFERENCE TO RELATED APPLICATION

This application is based upon and claims the benefit of priority from Japanese Patent Application No. 2012-199641, filed on Sep. 11, 2012, the entire contents of which are incorporated herein by reference.

TECHNICAL FIELD

The present disclosure relates to a DC/DC converter, and a control circuit and control method thereof.

BACKGROUND

Appliances including televisions, refrigerators and so on are operated with external commercial AC (Alternating Current) power. Electronic apparatuses including laptop computers, mobile terminals, PDAs (Personal Digital Assistants) and so on are also operated with commercial AC power and their internal batteries may be charged with the commercial AC power. Such appliances and electronic apparatuses (hereinafter collectively referred to electronic apparatuses) may contain a power supply (inverter) for converting commercial AC power into DC (Direct Current) power. Otherwise, an inverter may be incorporated in an external power adapter (AC adapter) of the electronic apparatuses.

SUMMARY

The present disclosure provides various embodiments of a control circuit, which is capable of stably controlling a DC/DC converter based on a voltage of an auxiliary winding.

According to one embodiment of the present disclosure, there is provided a control circuit of a DC/DC converter including a transformer having a primary winding and an auxiliary winding provided at a primary side and a secondary winding provided at a secondary side, a switching transistor connected to the primary winding, and a detection resistor provided on a path of the switching transistor. The control circuit includes: a pulse modulator configured to generate a pulse signal having a duty cycle adjusted such that an output voltage of the DC/DC converter approaches a target value, based on a detection voltage across the detection resistor and a feedback voltage depending on the output voltage of the DC/DC converter; and a driver configured to switch the switching transistor based on the pulse signal. The pulse modulator includes: an off signal generator to generate an off signal asserted depending on the feedback voltage and the detection voltage; and an on signal generator asserted depending on a voltage of one end of the auxiliary winding, wherein the pulse modulator is configured to generate the pulse signal which is shifted to an on level corresponding to turning-on of the switching transistor when the on signal is asserted and is shifted to an off level corresponding to turning-off of the switching transistor when the off signal is asserted. The on signal generator includes: a bottom detection comparator configured to compare the voltage of one end of the auxiliary winding with a predetermined threshold voltage and generate a bottom detection signal asserted when the voltage of the one end of the auxiliary winding becomes lower than the threshold voltage; a first time-out circuit configured to generate a first time-out signal asserted when the bottom detection signal is not asserted during a first time-out period; a second time-out circuit configured to generate a second time-out signal asserted when the bottom detection signal is not asserted during a predetermined second time-out period shorter than the first time-out period; and a logic part configured to generate the on signal based on the bottom detection signal, the first time-out signal and the second time-out signal.

With this configuration, the switching transistor can be switched based on the bottom detection signal if the voltage of the one end of the auxiliary winding is vibrated with no attenuation. The switching transistor can be switched based on the second time-out signal if the voltage of the one end of the auxiliary winding is vibrated with attenuation. The switching transistor can be switched based on the first time-out signal if the voltage of the one end of the auxiliary winding does not have any variation due to a failure or the like. Thus, the control circuit with this configuration can operate the DC/DC converter stably based on the voltage of the auxiliary winding.

The logic part may include a bottom determination unit which determines whether or not the bottom detection signal is asserted under a state where the switching transistor is turned off. The logic part may be configured to validate the second time-out signal when it is determined that the bottom detection signal is asserted, and the second time-out signal is invalidated when it is determined that the bottom detection signal is not asserted. With this configuration, it can be determined by the bottom determination unit whether the voltage of the one end of the auxiliary winding is vibrated or remains at a constant value due to a failure or the like.

The bottom determination unit may generate a bottom determination signal which is negated when the switching transistor is turned off, and thereafter is asserted when the bottom detection signal is asserted. When the bottom detection signal is not asserted, the bottom determination signal continues to be negated.

The bottom determination unit may include a D flip-flop having an input terminal to which a high level voltage is input, a clock terminal to which the bottom detection signal is input, and a reset terminal to which a signal to direct turning-on/off of the switching transistor is input.

The on signal generator may further include a set mask signal generator configured to generate a set mask signal asserted after lapse of a predetermined set mask time after the switching transistor is turned off. The logic part may assert the on signal based on one of the bottom detection signal, the first time-out signal and the second time-out signal, which is asserted earliest after the set mask signal is asserted.

The on signal generator may further include a bottom count controller configured to generate a set signal asserted when the number of times by which the bottom detection signal is asserted reaches a predetermined value. The logic part may assert the on signal based on the earliest asserted one of the set signal, the first time-out signal and the second time-out signal.

The on signal generator may further include a blanking circuit configured to mask the bottom detection signal during a predetermined mask period after the switching transistor is turned off.

The off signal generator may include an error comparator configured to compare the feedback signal depending on the output voltage of the DC/DC converter with the detection voltage across the detection resistor and generate an off signal asserted based on a result of the comparison.

According to another embodiment of the present disclosure, there is provided a control circuit including an on signal generator. The on signal generator includes: a bottom detection comparator configured to compare the voltage of the one end of the auxiliary winding with a predetermined threshold voltage and generate a bottom detection signal asserted when the voltage of the one end of the auxiliary winding becomes lower than the threshold voltage; and a logic part configured to assert the on signal (i) when the bottom detection signal is asserted after lapse of certain set mask time after the switching transistor is turned off, (ii) when a predetermined first time-out period elapses after the switching transistor is turned off, or (iii) when a state where the bottom detection signal is not asserted lasts for a second time-out period shorter than the first time-out period after the bottom detection signal is asserted.

According to another embodiment of the present disclosure, there is provided a control circuit including an on signal generator. The on signal generator includes: a bottom detection comparator configured to compare the voltage of the one end of the auxiliary winding with a predetermined threshold voltage and generate a bottom detection signal asserted when the voltage of the one end of the auxiliary winding becomes lower than the threshold voltage; and a logic part configured to assert the on signal (i) when the bottom detection signal is asserted by the predetermined number of times, (ii) when a predetermined first time-out period elapses after the switching transistor is turned off, or (iii) when a state where the bottom detection signal is not asserted lasts for a second time-out period shorter than the first time-out period after the bottom detection signal is asserted.

With this configuration, the switching transistor can be switched based on the bottom detection signal if the voltage of the one end of the auxiliary winding is vibrated with no attenuation. The switching transistor can be switched based on the second time-out signal if the voltage of the one end of the auxiliary winding is vibrated with attenuation. The switching transistor can be switched based on the first time-out signal if the voltage of the one end of the auxiliary winding does not have any variation due to a failure or the like. Thus, the control circuit with this configuration can operate the DC/DC converter stably based on the voltage of the auxiliary winding.

The control circuit may be integrated on a single semiconductor substrate. The term "integration" may include a case where all circuit elements are formed on the single semiconductor substrate, a case where some main circuit elements are integrated on the single semiconductor, and a case where some resistors, capacitors and so on are formed out of the semiconductor substrate. When the control circuit is integrated into a single IC (Integrated Circuit), a circuit area can be reduced and characteristics of circuit elements can be uniformly maintained.

According to another embodiment of the present disclosure, there is provided a DC/DC converter including: a transformer having a primary winding and an auxiliary winding provided at a primary side and a secondary winding provided at a secondary side; a switching transistor connected to the primary winding of the transformer; a detection resistor provided on a path of the switching transistor; a first diode having an anode connected to the secondary winding; a first output capacitor having one grounded end and the other end connected to a cathode of the first diode; a second diode having an anode connected to the auxiliary winding; a second output capacitor having one grounded end and the other end connected to a cathode of the second diode; a feedback circuit configured to generate a feedback voltage depending on an output voltage produced in the first output capacitor; and the above-described control circuit configured to switch the switching transistor based on the detection voltage across the detection resistor, the voltage of the one end of the auxiliary winding and the feedback voltage.

The feedback circuit may include: a shunt regulator configured to generate a feedback signal having a level regulated such that a difference between a voltage obtained by dividing the output voltage and a predetermined target value is zeroed; and a photo coupler having a primary side light emitting device controlled by the feedback signal, wherein a signal produced by a secondary side light emitting device of the photo coupler is supplied, as the feedback signal, to the control circuit.

According to another embodiment of the present disclosure, there is provided a power supply including: a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and supply the dropped voltage to a load.

According to another embodiment of the present disclosure, there is provided an electronic apparatus including: a load; a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and supply the dropped voltage to the load.

According to another embodiment of the present disclosure, there is provided a power adapter including: a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and generate a DC output voltage.

Other aspects of the present disclosure may include any combinations of the above-described elements or conversion of expression of the present disclosure between methods, apparatuses and so on.

DETAILED DESCRIPTION

Figure 1:
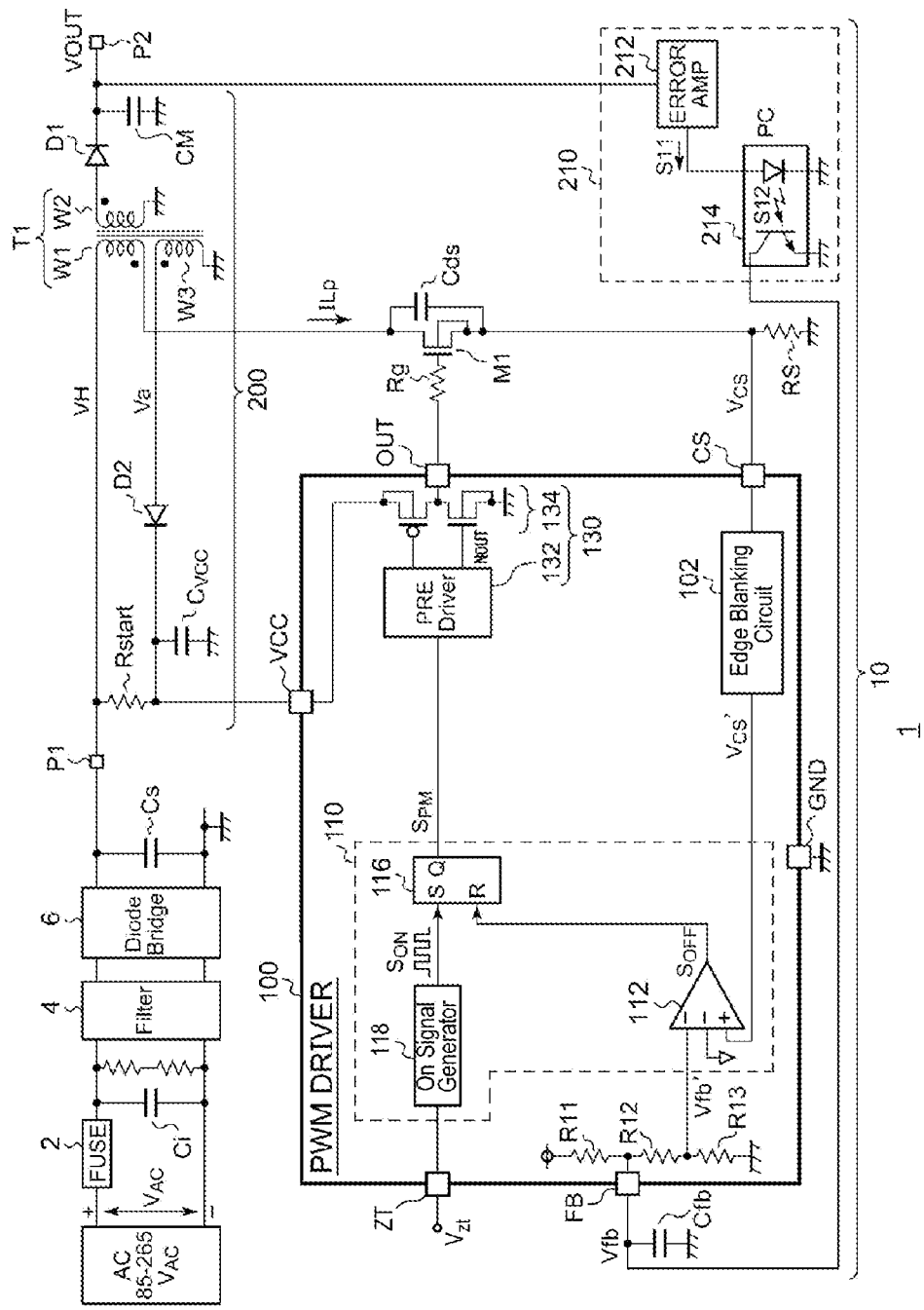
FIG. 1 is a circuit diagram showing an inverter including a DC/DC converter.

Various embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of member A and member B or has no damage to functions and effects shown by a combination of member A and member B. Similarly, the phrase "interposition of a member C between a member A and a member B" is intended to include direct connection of member A and member C or direct connection of member B and member C as well as indirect connection thereof via other member as long as the other member has no substantial effect on the electrical connection of the member A, the member B and the member C or has no damage to functions and effects shown by a combination of the member A, the member B and the member C.

FIG. 1 is a circuit diagram showing an inverter 1 including a DC/DC converter 10. The inverter 1 includes a fuse 2, an input capacitor Ci, a filter 4, a diode rectifier circuit 6, a smoothing capacitor Cs and a DC/DC converter 10.

A commercial AC voltage $V_{AC}$ is input to the filter 4 via the fuse 2 and the input capacitor Ci. The filter 4 removes a noise of the commercial AC voltage $V_{AC}$. The diode rectifier circuit 6 is a diode bridge circuit for full-wave rectifying the commercial AC voltage $V_{AC}$. An output voltage of the diode rectifier circuit 6 is smoothed by the smoothing capacitor Cs and is then converted into a DC voltage VH.

The DC/DC converter 10 receives and steps down the DC voltage VH and supplies an output voltage VOUT stabilized to a target value to a load (not shown) connected to an output terminal P2.

The DC/DC converter 10 includes a control circuit 100, an output circuit 200 and a feedback circuit 210. The output circuit 200 includes a transformer T1, a first diode D1, a first output capacitor CM, a switching transistor M1 and a detection resistor RS. The topology of the output circuit 200 is typical and therefore, explanation thereof will be omitted.

An output terminal (OUT terminal) of the control circuit 100 is connected to a gate electrode of the switching transistor M1 via a resistor Rg. As the control circuit 100 switches the switching transistor M1, the input voltage VH is stepped down and the output voltage VOUT is generated. In addition, by adjusting a duty cycle of a switching operation of the switching transistor M1, the control circuit 100 controls coil current ILp flowing into a primary winding W1 of the transformer T1 while stabilizing the output voltage VOUT to the target value.

The detection resistor RS is connected in series to the primary winding W1 of the transformer T1 and the switching transistor M1. A voltage drop (detection voltage) Vcs proportional to the current ILp flowing into the primary winding W1 and the switching transistor M1 is produced in the detection resistor RS. The detection voltage Vcs is input to a current detection terminal (CS terminal) of the control circuit 100. The control circuit 100 controls the current ILp flowing into the primary winding W1 on the basis of the detection voltage Vcs.

The feedback circuit 210 generates a feedback voltage Vfb depending on the output voltage VOUT and supplies it to a feedback terminal (FB terminal) of the control circuit 100. The feedback circuit 210 includes a shunt regulator 212 and a photo coupler 214. The shunt regulator 212 is an error amplifier, which generates a feedback signal S11 having a level regulated such that an error between the output voltage VOUT and a predetermined target value becomes zero, and supplies the generated feedback signal S11 to a light emitting diode of the photo coupler 214. A photo transistor of the photo coupler 214 converts a light signal S12 emitted from the light emitting diode into the feedback voltage Vfb depending on the feedback signal S11.

The primary side of the transformer T1 has an auxiliary winding W3 in addition to the primary winding W1. The auxiliary winding W3, a second diode D2 and a second output capacitor Cvcc form a second DC/DC converter. In response to the switching of the switching transistor M1, a DC voltage Vcc is produced in the second output capacitor Cvcc. The DC voltage Vcc is supplied to a power terminal VCC (VCC terminal) of the control circuit 100. A start resistor Rstart is interposed between the VCC terminal and the input terminal P1. When starting the operation of the control circuit 100, the capacitor Cvcc is charged via the start resistor Rstart and the power voltage Vcc is supplied to the control circuit 100.

The control circuit 100 is a pulse modulator of a so-called peak current mode and includes an edge blanking circuit 102, a pulse modulator 110 and a driving circuit 130.

The detection voltage Vcs jumps temporarily after the switching transistor M1 is turned on. In order to prevent the switching transistor M1 from being turned off due to the jumping of the detection voltage Vcs, the edge blanking circuit 102 masks the detection voltage Vcs during a mask period immediately after the turning-on of the switching transistor M1.

A capacitor Cfb is externally attached to the FB terminal. The FB terminal is pulled up by a resistor R11. The feedback voltage Vfb is divided by resistors R12 and R13.

The pulse modulator 110 generates a pulse signal $S_{PM}$ having a duty cycle adjusted depending on the feedback voltage Vfb. The pulse modulator 110 controls a timing at which the switching transistor M1 is turned off, based on the detection voltage Vcs proportional to the coil current ILp flowing into the switching transistor M1. The driving circuit 130 switches the switching transistor M1 based on the pulse signal $S_{PM}$.

The pulse modulator 110 of FIG. 1 is a peak current mode modulator and includes an error comparator 112, a logic part 116 and an on signal generator 118. The error comparator 112 compares a divided feedback voltage Vfb' with a detection voltage Vcs' and generates an off signal $S_{OFF}$ asserted when the detection voltage Vcs' reaches the divided feedback voltage Vfb'.

The control circuit 100 has an auxiliary terminal (ZT terminal). A voltage Va of one end of the auxiliary winding W3 is divided by resistors Rzt1 and Rzt2 (not shown). A divided voltage (or a ZT voltage) Vzt is input to the ZT terminal.

The on signal generator 118 generates an on signal $S_{ON}$ asserted when the voltage of one end of the auxiliary winding W3 becomes lower than a predetermined threshold voltage Vth_zt.

Energy is stored in the transformer T1 during an on period of the switching transistor M1, whereas energy is released during an off period of the switching transistor M1. The voltage Va remains at a certain level of voltage in a period during which current ILs flows into a secondary winding W2 immediately after the switching transistor M1 is turned off. When the energy of the transformer T1 is zeroed and the current ILs is zeroed, the voltage Va is vibrated by a quasiresonance. When the voltage Va is reduced to near zero by the vibration, the on signal generator 118 determines that the energy of the transformer T1 is zeroed, and then asserts the on signal $S_{ON}$ to turn on the switching transistor M1 again.

The logic part 116 is a SR flip-flop and has a set terminal S to which the on signal $S_{ON}$ is input and a reset terminal R to which the off signal $S_{OFF}$ is input. The output (or a pulse modulated signal) $S_{PM}$ of the logic part 116 is shifted to an on level (high level) corresponding to turning-on of the switching transistor M1 whenever the on signal $S_{ON}$ is asserted, and is shifted to an off level (low level) corresponding to the turning-off of the switching transistor M1 whenever the off signal $S_{OFF}$ is asserted.

The driving circuit 130 switches the switching transistor M1 based on the pulse signal $S_{PM}$.

Figure 2:
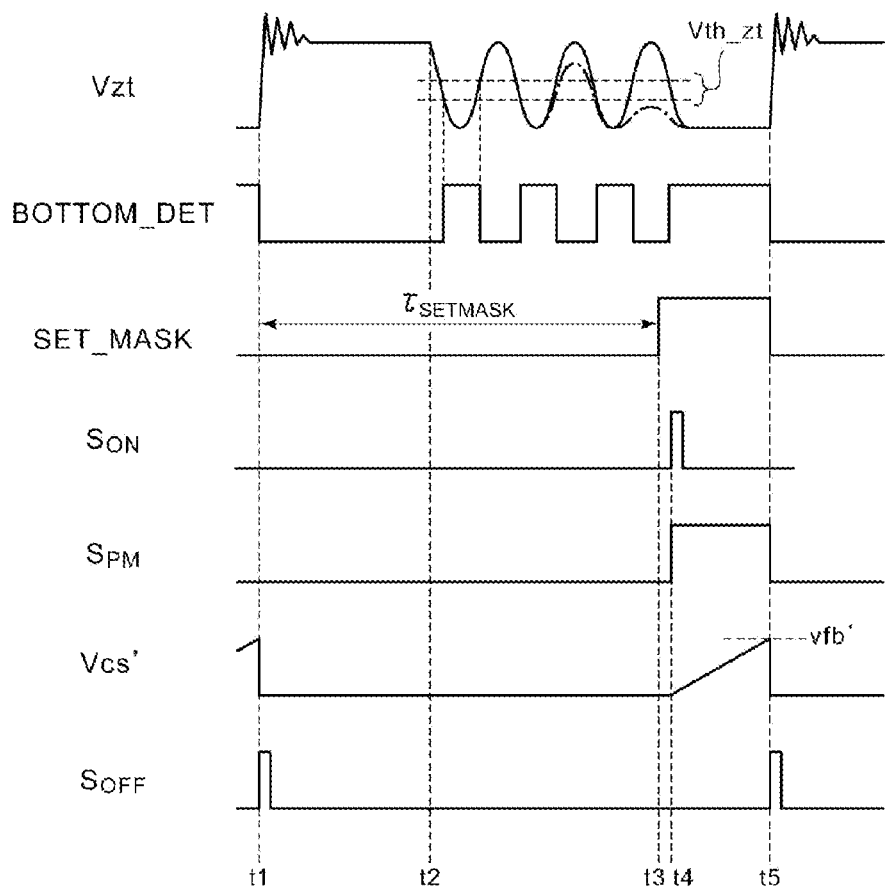
FIG. 2 is a waveform diagram showing an operation of a control circuit of FIG. 1.

FIG. 2 is a waveform diagram showing an operation of the control circuit 100 of FIG. 1. At time t1, the off signal $S_{OFF}$ is asserted and the switching transistor M1 is turned off. While energy remains in the transformer T1 after the switching transistor M1 is turned off, the ZT voltage Vzt of the ZT terminal is maintained at a certain level. When the energy of the transformer T1 is zeroed, a voltage across the primary winding W1 and a voltage across the auxiliary winding W3 begin to be vibrated by a resonance circuit that includes the primary winding W1 and a capacitor Cds (at time t2).

The on signal generator 118 compares the ZT voltage Vzt with the predetermined threshold voltage Vth_zt and generates a bottom detection signal BOTTOM_DET asserted whenever Vzt<Vth_zt. A hysteresis is set for the threshold voltage Vth_zt.

Set mask time $\tau_{SETMASK}$ is measured to set the upper limit of a switching frequency of the switching transistor M1. A set mask signal SET_MASK is asserted after lapse of the set mask time $\tau_{SETMASK}$ after the switching transistor M1 is turned off (at time t3). The bottom detection signal BOTTOM_DET in the set mask time $\tau_{SETMASK}$ is masked (invalidated).

When the bottom detection signal BOTTOM_DET is asserted after lapse of the set mask time $\tau_{SETMASK}$, the on signal generator 118r asserts the on signal $S_{ON}$ (at time t4).

When the on signal $S_{ON}$ is asserted, the pulse signal $S_{PM}$ is shifted to an on level and the switching transistor M1 is turned on. When the switching transistor M1 is turned on, the coil current ILp increases with time and the detection voltage Vcs' rises accordingly. When the detection voltage Vcs' reaches the feedback voltage Vfb', the off signal $S_{OFF}$ is asserted and the switching transistor M1 is turned off again (at time t5).

The control circuit 100 repeats the above operation.

In the DC/DC converter 10 of FIG. 1, there is a possibility that the ZT voltage Vzt is attenuated while being vibrated after time t2. The ZT voltage Vzt at this time is indicated by an alternate long and short dash line in FIG. 2. If the ZT voltage Vzt remains lower than the threshold voltage Vth_zt, the on signal $S_{ON}$ cannot be asserted and the switching transistor M1 cannot be accordingly turned on again.

In addition, if the resistor Rzt2 is circuit-shorted or the output terminal of the DC/DC converter 10 is grounded, the ZT voltage Vzt will be at near 0V and the on signal $S_{ON}$ cannot be accordingly asserted.

The DC/DC converter 10 according to an embodiment of the present disclosure includes the control circuit 100, the output circuit 200 and the feedback circuit 210.

The control circuit 100 according to the embodiment may be a functional IC integrated on a single semiconductor substrate. The control circuit 100 includes the pulse modulator 110, the driving circuit 130 and the edge blanking circuit 102. The pulse modulator 110 is a peak current mode modulator and generates a pulse signal $S_{PM}$ having a duty cycle adjusted such that an output voltage VOUT of the DC/DC converter 10 approaches a target value, based on a voltage Va of one end of an auxiliary winding W3, a detection voltage Vcs across a detection resistor RS, and a feedback voltage Vfb depending on the output voltage VOUT of the DC/DC converter 10.

The driving circuit 130 switches the switching transistor M1 based on the pulse signal $S_{PM}$. The driving circuit 130 includes a pre-driver 132 and a driver 134.

The pulse modulator 110 includes the error comparator (off signal generator) 112, the on signal generator 118 and the logic part 116.

The error comparator 112 generates an off signal $S_{OFF}$ asserted depending on the feedback voltage Vfb and the detection voltage Vcs. Specifically, the error comparator 112 compares a feedback voltage Vfb' with a detection voltage Vcs' and generates the off signal SOFF asserted (having high level) when Vfb'<Vcs'.

The on signal generator 118 generates an on signal $S_{ON}$ asserted depending on a voltage Va of one end of the auxiliary winding W3.

The logic part 116 is a SR flip-flop and has a set terminal S to which the on signal $S_{ON}$ is input and a reset terminal R to which the off signal $S_{OFF}$ is input. An output signal (or a pulse modulated signal) $S_{PM}$ of the logic part 116 is shifted to an on level (high level) corresponding to turning-on of the switching transistor M1 whenever the on signal $S_{ON}$ is asserted, and is shifted to an off level (low level) corresponding to turning-off of the switching transistor M1 whenever the off signal $S_{OFF}$ is asserted. The logic part 116 may be configured as a logic device other than an SR flip-flop.

Figure 3:
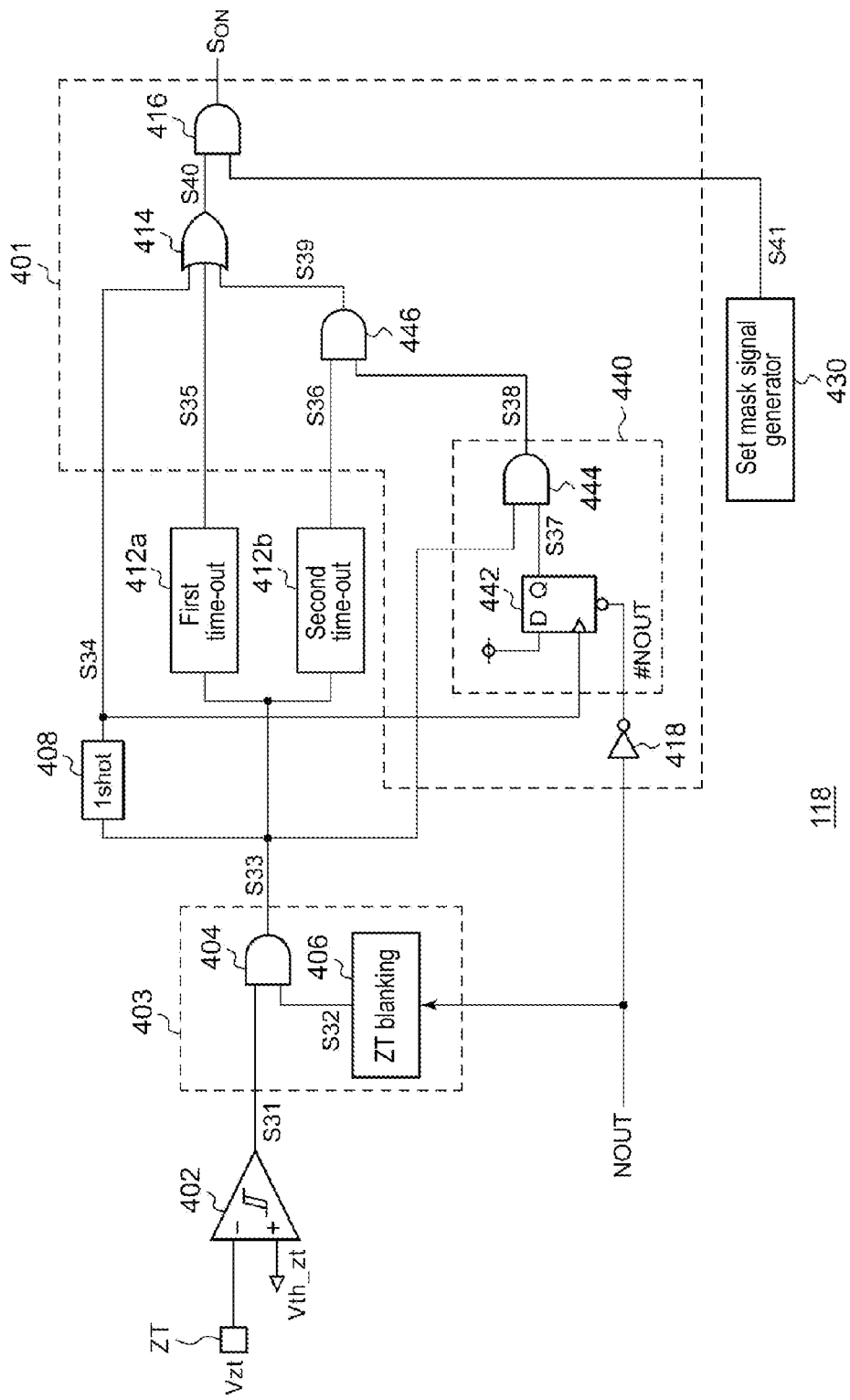
FIG. 3 is a circuit diagram showing a configuration of an on signal generator of a control circuit according to the embodiment.

FIG. 3 is a circuit diagram showing a configuration of the on signal generator 118 of the control circuit 100 according to the embodiment. The on signal generator 118 includes a logic part 401, a bottom detection comparator 402, a ZT blanking circuit 403 and a one-shot circuit 408.

The bottom detection comparator 402 compares a ZT voltage Vzt with a predetermined threshold voltage Vth_zt and generates a bottom detection signal S31 asserted when the ZT voltage Vzt becomes lower than the threshold voltage Vth_zt.

There is a possibility that the ZT voltage Vzt notably swings immediately after the switching transistor M1 is turned off, and a bottom is incorrectly detected despite the fact that energy remains in the transformer T1. The ZT blanking circuit 403 is provided to prevent such incorrect bottom detection. The ZT blanking circuit 403 masks the bottom detection signal S31 during a certain masking period after the switching transistor M1 is turned off.

A blanking timer 406 generates a ZT mask signal S32 having a high level during a certain masking period after a gate signal NOUT of an N channel MOSFET of the driver 134 is shifted to a high level. An AND gate 404 masks the bottom detection signal S31 by performing an AND operation for the bottom detection signal S31 and the ZT mask signal S32.

A bottom detection signal S33 output from the ZT blanking circuit 403 is asserted whenever the ZT voltage Vzt decreases to near the bottom after the switching transistor M1 is turned off.

The one-shot circuit 408 generates a bottom detection signal S34 having a high level during a certain period after the bottom detection signal S33 is asserted.

A first time-out circuit 412a generates a first time-out signal S35 asserted when a state where the bottom detection signal S33 is negated lasts for a first time-out period τ1 (for example, 15 μs). The first time-out circuit 412a is reset whenever the bottom detection signal S33 is asserted, and counts up while the bottom detection signal S33 is being negated.

When a count value reaches a value corresponding to the first time-out period τ1, the first time-out signal S35 is asserted.

A second time-out circuit 412b generates a second time-out signal S36 asserted when the state where the bottom detection signal S33 is negated lasts for a second time-out period τ2 (for example, 5 μs) shorter than the first time-out period τ1. The second time-out circuit 412b is reset whenever the bottom detection signal S33 is asserted, and counts up while the bottom detection signal S33 is being negated. When a count value reaches a value corresponding to the second time-out period τ2, the second time-out signal S36 is asserted.

The logic part 401 generates the on signal $S_{ON}$ based on the bottom detection signal S34, the first time-out signal S35 and the second time-out signal S36.

The logic part 401 includes a bottom determining unit 440 to determine whether or not the bottom detection signal S33 is asserted under a state where the switching transistor M1 is turned off, in other words, whether or not the ZT voltage Vzt is vibrated.

The bottom determining unit 440 is negated when the switching transistor M1 is turned off, and then generates a bottom determination signal S37 asserted when the bottom detection signal S34 is asserted. For example, the bottom determining unit 440 includes a D flip-flop 442 having an input terminal to which a high level voltage is input, a clock terminal to which the bottom detection signal S34 is input, and a reset terminal (having inverted logic) to which a signal #NOUT to direct turning-on/off of the switching transistor M1 is input. The signal #NOUT is a signal produced by inverting the signal NOUT by an inverter 418. Whenever the signal NOUT is shifted to a high level, in other words, whenever the switching transistor M1 is turned off, the D flip-flop 442 is reset and the bottom determination signal S37 has a low level (i.e., is negated). When the bottom detection signal S34 is asserted, the bottom determination signal S37 has a high level (i.e., is asserted).

An AND gate 444 generates a bottom determination signal S38 by performing an AND operation for the bottom determination signal S37 and the bottom detection signal S33.

An AND gate 446 masks the second time-out signal S36 with the bottom determination signal S37. Thus, the second time-out signal S36 is validated when it is determined that the bottom detection signal S34 is asserted, whereas the second time-out signal S36 is invalidated when it is determined that the bottom detection signal S34 is not asserted.

A set mask signal generator 430 generates a set mask signal S41 asserted (having a high level) after lapse of certain set mask time $τ_{SETMASK}$ after the switching transistor M1 is turned off.

The logic part 401 asserts the on signal $S_{ON}$ based on one of the bottom detection signal S34, the first time-out signal S35 and the second time-out signal S36, whichever is asserted earliest after the set mask signal S41 is asserted. Specifically, an OR gate 414 generates a logical sum of the bottom detection signal S34, the first time-out signal S35 and the second time-out signal S36. This corresponds to selecting the earliest asserted one of these three signals. An AND gate 416 generates the on signal $S_{ON}$ by performing an AND operation of an output S40 of the OR gate 414 and the set mask signal S41.

In other words, the logic part 401 asserts the on signal $S_{ON}$ (i) when the bottom detection signal S34 is asserted after lapse of a certain set mask time $τ_{SETMASK}$ after the switching transistor M1 is turned off, (ii) when the first time-out period τ1 elapses after the switching transistor M1 is turned off, or (iii) when a state where the bottom detection signal S34 is not asserted lasts for the second time-out period τ2 after the bottom detection signal S34 is asserted.

Figure 4:
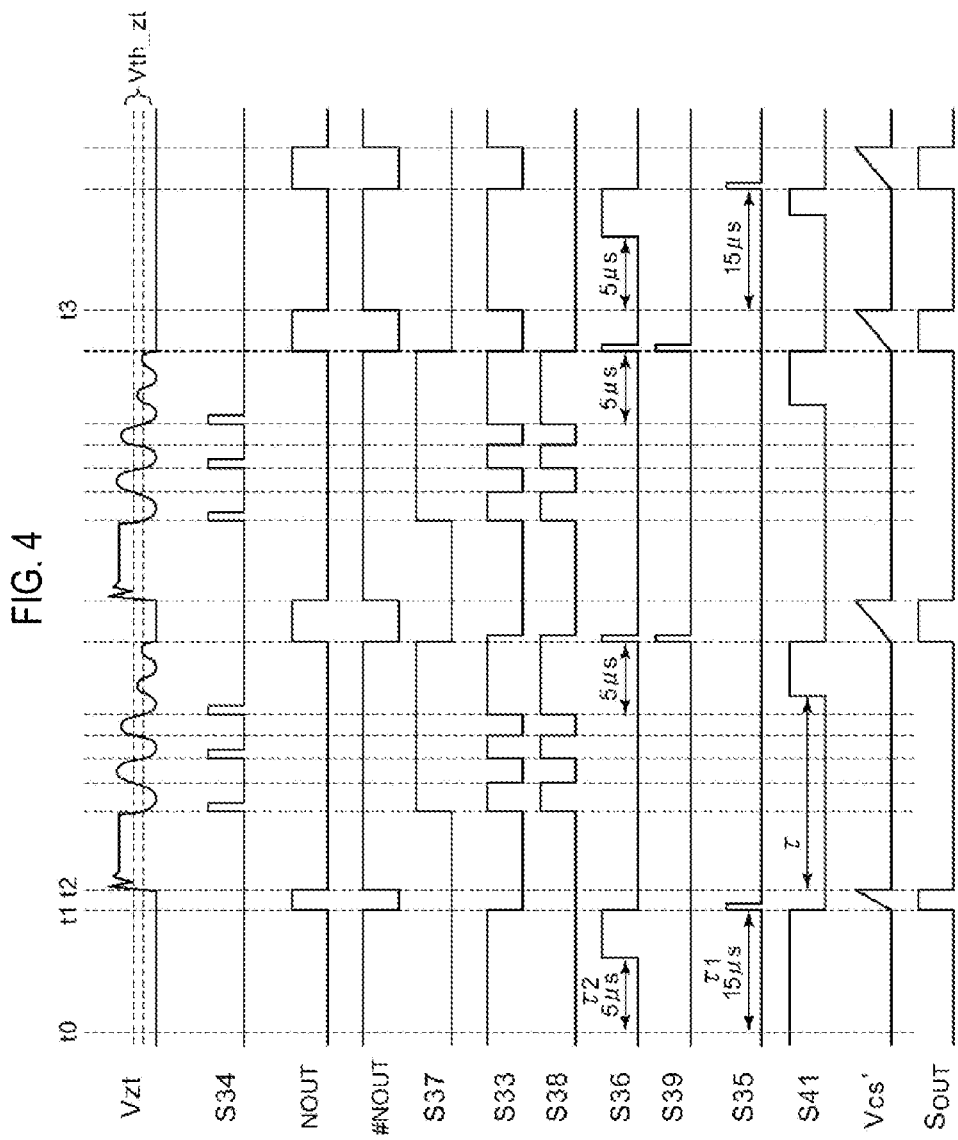
FIG. 4 is waveform diagram showing an operation of the control circuit according to the embodiment.

Subsequently, an operation of the control circuit 100 will be described. FIG. 4 is a time chart showing an operation of the control circuit 100.

A time period between time t0 and time t1 shows an operation when starting the control circuit 100. At time t0, the control circuit 100 is started. Immediately after the starting point, the ZT voltage Vzt remains at a ground voltage. The second time-out signal S36 is asserted after lapse of the second time-out period τ2 from the starting point, and the first time-out signal S35 is asserted after lapse of the first time-out period τ1. Since the bottom detection signal S34 is not asserted immediately after the starting point, the bottom determination signal S38 has a low level and the second time-out signal S36 is invalidated. At time t1 after the lapse of the first time-out period τ1, when the first time-out signal S35 is asserted, the on signal $S_{ON}$ is asserted and the switching transistor M1 is turned on.

When the switching transistor M1 is turned on, current ILp of the primary winding W1 increases to raise the detection voltage Vcs'. When the detection voltage Vcs' reaches the feedback voltage Vfb', the off signal $S_{OFF}$ is asserted, a switching signal $S_{OUT}$ has a low level and the switching transistor M1 is turned off again (at time t2).

After time t2, the ZT voltage Vzt is vibrated while being attenuated in a turning-off period of the switching transistor M1. It is shown in FIG. 4 that the bottom detection signal S34 has a low level after being asserted three times. With the lapse of the second time-out period τ2 after the bottom detection signal S34 is asserted at the third time, the second time-out signal S36 is asserted. Since the bottom determination signal S37 is asserted by the bottom detection signal S34 at the first time, the second time-out signal S36 is validated and the switching transistor M1 is turned on by the second time-out signal S36.

After time t3, failure such as grounding of the output terminal of the DC/DC converter 10 and short-circuit of the resistor Rzt2 may occur. In this case, after the switching transistor M1 is turned off, the ZT voltage Vzt remains at the ground voltage (0V) and the bottom detection signal S34 is not asserted. After the switching transistor M1 is turned off, the second time-out signal S36 is asserted after lapse of the second time-out period τ2 and the first time-out signal S35 is asserted after lapse of the first time-out period τ1. After the switching transistor M1 is turned off, since the bottom detection signal S34 is not asserted even once, the bottom determination signal S37 is negated and, accordingly, the second time-out signal S36 is invalidated. As a result, the switching transistor M1 is turned on based on the first time-out signal S35.

According to the control circuit 100, if the voltage Va of the one end of the auxiliary winding W3, i.e., the ZT voltage Vzt, is vibrated without being attenuated, the switching transistor M1 is switched depending on the bottom detection signal S34.

If the ZT voltage Vzt is vibrated with attenuation, the switching transistor M1 is switched depending on the second time-out signal S36.

When the ZT voltage Vzt does not have any variation due to a failure or the like, the switching transistor M1 is switched depending on the first time-out signal S35.

Accordingly, the control circuit 100 allows the DC/DC converter 1 to be stably operated based on the voltage Va of the auxiliary winding W3 depending on conditions of the DC/DC converter 1.

Advantages of the control circuit 100 can become more apparent from a comparison with a comparative technique employing only one time-out circuit. In the comparative technique, if a time-out period is set to be long (for example, 15 μs), there is a large difference between a switching frequency at which the ZT voltage Vzt is vibrated with attenuation and a switching frequency at which the ZT voltage Vzt is vibrated with no attenuation, which may result in output voltage variation and sound noise due to frequency variation.

On the other hand, if the time-out period is set to be short (for example, 5 μs), there is a small difference between the switching frequency in the attenuated vibration and the switching frequency in the non-attenuated vibration, which may result in reduction in output voltage variation and sound noise. However, this is not preferable since a high switching frequency needs to be maintained even when the ZT voltage Vzt is maintained at near the ground voltage due to a failure.

However, the control circuit 100 according to the embodiment can overcome the above problems of the comparative technique since two time-out periods are set and the switching frequency is automatically and optimally controlled depending on conditions of the DC/DC converter 10.

An application of the DC/DC converter 10 will be described next. The inverter 1 including the DC/DC converter 10 is suitable to be used for an AC adapter or a power block of an electronic apparatus.

Figure 5:
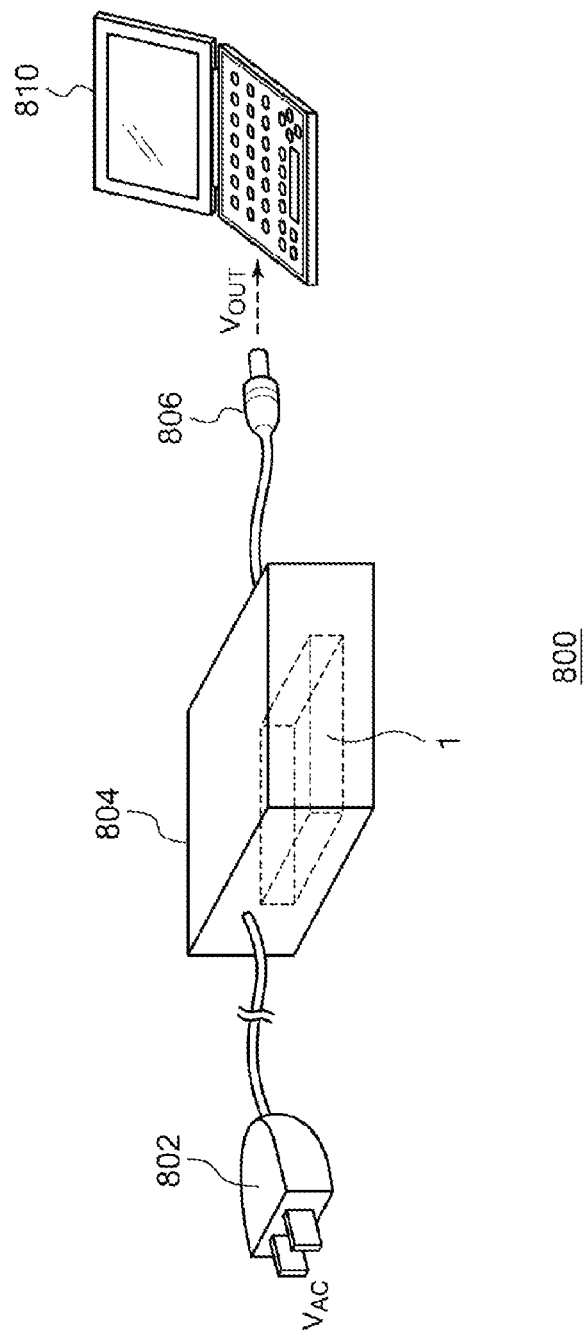
FIG. 5 is a view showing an AC adapter including the inverter according to the embodiment.

FIG. 5 is a view showing an AC adapter 800 including the inverter 1. The AC adapter 800 includes a plug 802, a housing 804 and a connector 806. The plug 802 receives a commercial AC voltage $V_{AC}$ from an electrical socket (not shown). The inverter 1 is mounted within the housing 804. A DC output voltage VOUT generated by the inverter 1 is supplied from the connector 806 to an electronic apparatus 810. Examples of the electronic apparatus 810 may include a notebook PC, a digital camera, a digital video camera, a mobile phone, a portable audio player and the like.

Figure 6A:
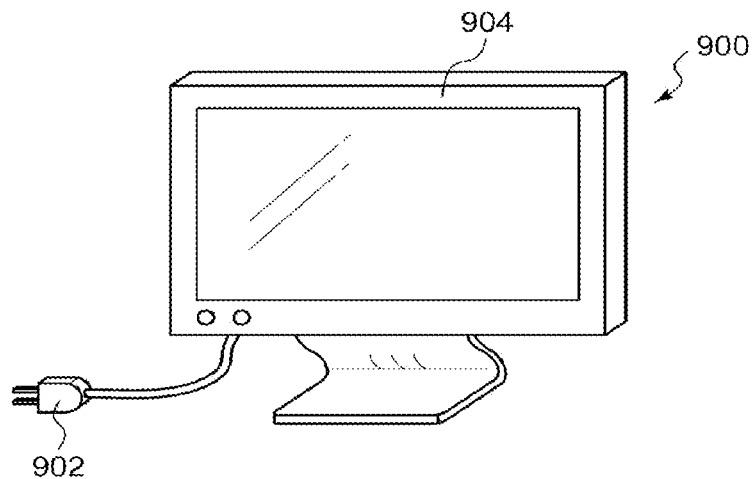
FIGS. 6A and 6B are views showing an electronic apparatus equipped with the inverter according to the embodiment.
Figure 6B:
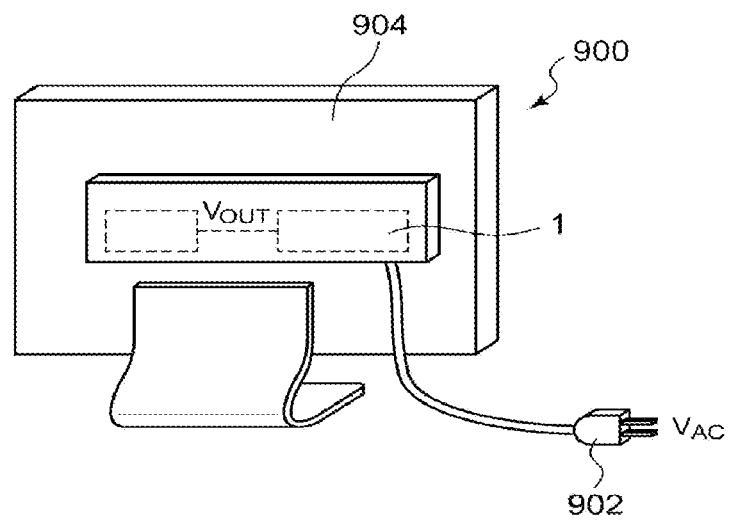

FIGS. 6A and 6B are views showing an electronic apparatus 900 including the inverter 1. Although it is illustrated with a display apparatus in FIGS. 6A and 6B, the electronic apparatus 900 is not particularly limited but may be any apparatus incorporating a power supply, such as an audio apparatus, a refrigerator, a washing machine, a vacuum cleaner and the like. A plug 902 receives a commercial AC voltage $V_{AC}$ from an electrical socket (not shown). The inverter 1 is mounted within a housing 904. A DC output voltage VOUT generated by the inverter 1 is supplied to a load mounted within the same housing 904, such as a microcomputer, a DSP (Digital Signal Processor), a power supply circuit, an illumination apparatus, an analog circuit, a digital circuit or the like.

Heretofore, the present disclosure has been described by way of specific embodiments. The disclosed embodiments are merely examples and it is to be understood by those skilled in the art that combinations of elements and processes of the embodiments can be modified in various ways and such modification falls within the scope of the present disclosure. The following description is given to such modification.

(First Modification)

Figure 7:
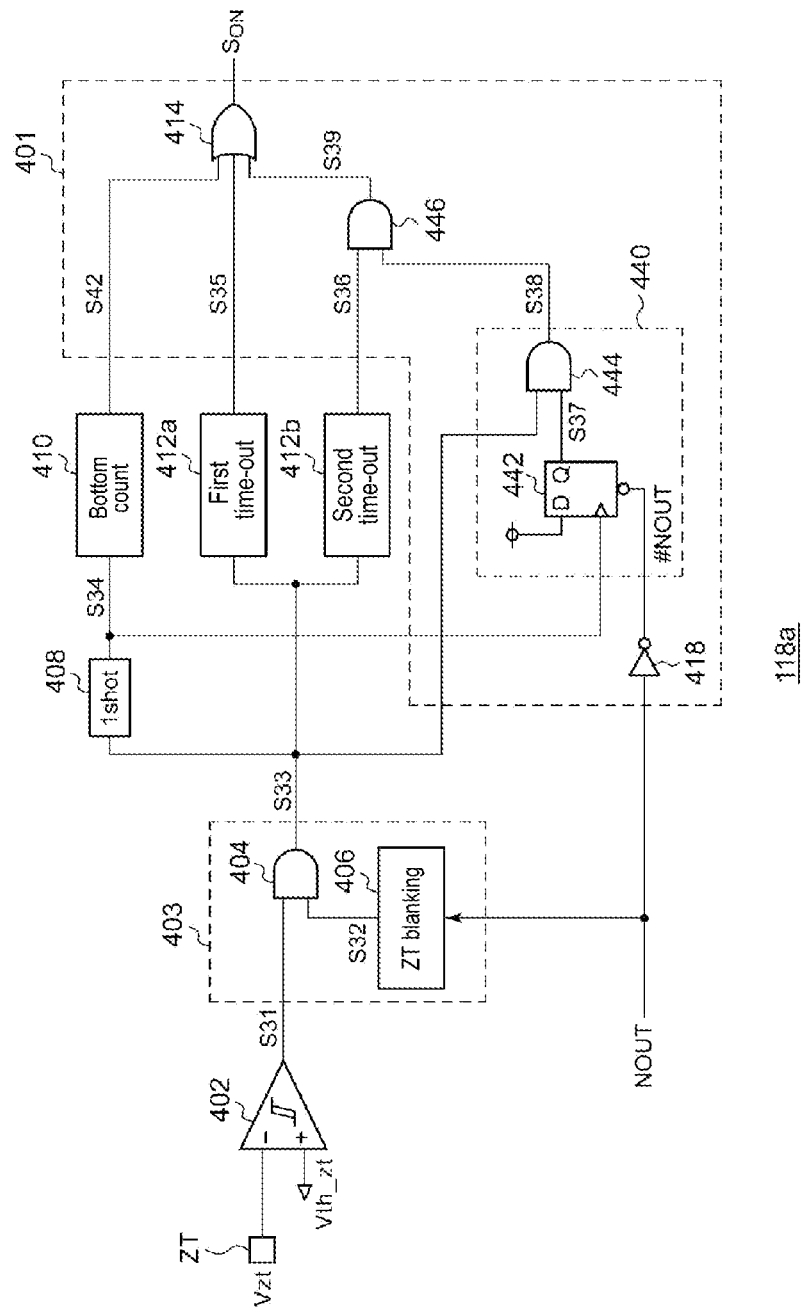
FIG. 7 is a circuit diagram showing a configuration of an on signal generator according to a first modification.

FIG. 7 is a circuit diagram showing a configuration of an on signal generator 118a according to a first modification. The on signal generator 118a includes a bottom count controller 410 as a substitution for the set mask signal generator 430 of the on signal generator 118 of FIG. 3.

The bottom count controller 410 generates a set signal S42 asserted when the number of times by which the bottom detection signal S34 is asserted reaches a predetermined value. The OR gate 414 generates the on signal $S_{ON}$ by performing an OR operation for the set signal S42, the first time-out signal S35 and the second time-out signal S36. That is, the logic part 401 asserts the on signal $S_{ON}$ based on the earliest asserted one of the set signal S42, the first time-out signal S35 and the second time-out signal S36.

In this modification, the on signal generator 118a asserts the on signal $S_{ON}$ (i) when the bottom detection signal S34 is asserted by the predetermined number of times, (ii) when a certain first time-out period τ1 elapses after the switching transistor M1 is turned off, or (iii) when a state where the bottom detection signal S34 is not asserted lasts for the second time-out period τ2 after the bottom detection signal S34 is asserted.

The first modification can obtain the same effects as the above embodiments.

(Second Modification)

Although it has been illustrated in the above embodiments that the shunt regulator (error amplifier) 212 is disposed at the secondary side of the transformer T1, the error amplifier may be disposed at the primary side thereof or may be incorporated into the control circuit 100.

Although it has been illustrated in the above embodiments that the circuits described are constructed by the positive logic (high-active) system in which assertion of each signal is assigned with a high level and negation thereof is assigned with a low level, the circuits may be constructed by a negative logic system or a combination of the positive logic system and the negative logic system.

According to the present disclosure in some embodiments, it is possible to provide a control circuit which is capable of stably controlling a DC/DC converter based on a voltage of an auxiliary winding.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter including a transformer having a primary winding and an auxiliary winding provided at a primary side and a secondary winding provided at a secondary side, a switching transistor connected to the primary winding, and a detection resistor provided on a path of the switching transistor, the control circuit comprising:

a pulse modulator configured to generate a pulse signal having a duty cycle adjusted such that an output voltage of the DC/DC converter approaches a target value, based on a detection voltage across the detection resistor and a feedback voltage depending on the output voltage of the DC/DC converter; and a driver configured to switch the switching transistor based on the pulse signal, wherein the pulse modulator includes:

an off signal generator configured to generate an off signal asserted depending on the feedback voltage and the detection voltage; and an on signal generator asserted depending on a voltage of one end of the auxiliary winding, wherein the pulse modulator is configured to generate the pulse signal which is shifted to an on level corresponding to turning-on of the switching transistor when the on signal is asserted and is shifted to an off level corresponding to turning-off of the switching transistor when the off signal is asserted, and wherein the on signal generator includes:
a bottom detection comparator configured to compare the voltage of the one end of the auxiliary winding with a predetermined threshold voltage and generate a bottom detection signal asserted when the voltage of the one end of the auxiliary winding becomes lower than the threshold voltage;
a first time-out circuit configured to generate a first time-out signal asserted when the bottom detection signal is not asserted during a first time-out period;
a second time-out circuit configured to generate a second time-out signal asserted when the bottom detection signal is not asserted during a predetermined second time-out period shorter than the first time-out period; and
a logic part configured to generate the on signal based on the bottom detection signal, the first time-out signal and the second time-out signal.

2. The control circuit of claim 1, wherein the logic part includes a bottom determination unit which determines whether or not the bottom detection signal is asserted under a state where the switching transistor is turned off, and
wherein the logic part is configured to validate the second time-out signal when it is determined that the bottom detection signal is asserted, and invalidate the second time-out signal when it is determined that the bottom detection signal is not asserted.

3. The control circuit of claim 2, wherein the bottom determination unit generates a bottom determination signal which is negated when the switching transistor is turned off, and thereafter is asserted when the bottom detection signal is asserted.

4. The control circuit of claim 3, wherein the bottom determination unit includes a D flip-flop having an input terminal to which a high level voltage is input, a clock terminal to which the bottom detection signal is input, and a reset terminal to which a signal to direct turning-on/off of the switching transistor is input.

5. The control circuit of claim 1, further comprising a set mask signal generator configured to generate a set mask signal asserted after lapse of a predetermined set mask time after the switching transistor is turned off,
wherein the logic part asserts the on signal based on one of the bottom detection signal, the first time-out signal and the second time-out signal, which is asserted earliest after the set mask signal is asserted.

6. The control circuit of claim 1, wherein the on signal generator further includes a bottom count controller configured to generate a set signal asserted when the number of times by which the bottom detection signal is asserted reaches a predetermined value,
wherein the logic part asserts the on signal based on the earliest asserted one of the set signal, the first time-out signal and the second time-out signal.

7. The control circuit of claim 1, wherein the on signal generator further includes a blanking circuit configured to mask the bottom detection signal during a predetermined mask period after the switching transistor is turned off.

8. The control circuit of claim 1, wherein the off signal generator includes an error comparator configured to compare the feedback signal depending on the output voltage of the DC/DC converter with the detection voltage across the detection resistor and generate an off signal asserted based on a result of the comparison.

9. The control circuit of claim 1, wherein the control circuit is integrated on a single semiconductor substrate.

10. A DC/DC converter comprising:
a transformer having a primary winding and an auxiliary winding provided at a primary side and a secondary winding provided at a secondary side;
a switching transistor connected to the primary winding of the transformer;
a detection resistor provided on a path of the switching transistor;
a first diode having an anode connected to the secondary winding;
a first output capacitor having one end connected to a ground and the other end connected to a cathode of the first diode;
a second diode having an anode connected to the auxiliary winding;
a second output capacitor having one end connected to the ground and the other end connected to a cathode of the second diode;
a feedback circuit configured to generate a feedback voltage depending on an output voltage produced in the first output capacitor; and
a control circuit of claim 1, wherein the control circuit is configured to switch the switching transistor based on the detection voltage across the detection resistor, the voltage of the one end of the auxiliary winding and the feedback voltage.

11. An electronic apparatus comprising:
a load;
a filter configured to filter a commercial AC voltage;
a diode rectifier circuit configured to full wave-rectify an output voltage of the filter;
a smoothing capacitor configured to generate a DC input voltage by smoothing an output voltage of the diode rectifier circuit; and
a DC/DC converter of claim 10, which is configured to drop the DC input voltage and supply the dropped voltage to the load.

12. A power adapter comprising:
a filter configured to filter a commercial AC voltage;
a diode rectifier circuit configured to full wave-rectify an output voltage of the filter;
a smoothing capacitor configured to generate a DC input voltage by smoothing an output voltage of the diode rectifier circuit; and
a DC/DC converter of claim 10, which is configured to drop the DC input voltage and generate a DC output voltage.

13. The DC/DC converter of claim 10, wherein the feedback circuit includes:
a shunt regulator configured to generate a feedback signal having a level regulated such that a difference between a voltage obtained by dividing the output voltage and a predetermined target value is zeroed; and
a photo coupler having a primary side light emitting device controlled by the feedback signal,
wherein a signal produced by a secondary side light emitting device of the photo coupler is supplied, as the feedback signal, to the control circuit.

14. A power supply comprising:
a filter configured to filter a commercial AC voltage;
a diode rectifier circuit configured to full wave-rectify an output voltage of the filter;
a smoothing capacitor configured to generate a DC input voltage by smoothing an output voltage of the diode rectifier circuit; and a DC/DC converter of claim 10, which is configured to drop the DC input voltage and supply the dropped voltage to a load.

15. A control circuit of a DC/DC converter including a transformer having a primary winding and an auxiliary winding provided at a primary side and a secondary winding provided at a secondary side, a switching transistor connected to the primary winding, and a detection resistor provided on a path of the switching transistor, the control circuit comprising:

a pulse modulator configured to generate a pulse signal having a duty cycle adjusted such that an output voltage of the DC/DC converter approaches a target value, based on a detection voltage across the detection resistor and a feedback voltage depending on the output voltage of the DC/DC converter; and a driver configured to switch the switching transistor based on the pulse signal, wherein the pulse modulator includes:

an off signal generator configured to generate an off signal asserted depending on the feedback voltage and the detection voltage; and an on signal generator asserted depending on a voltage of one end of the auxiliary winding, wherein the pulse modulator is configured to generate the pulse signal which is shifted to an on level corresponding to turning-on of the switching transistor when the on signal is asserted and is shifted to an off level corresponding to turning-off of the switching transistor when the off signal is asserted, and wherein the on signal generator includes:

a bottom detection comparator configured to compare the voltage of the one end of the auxiliary winding with a predetermined threshold voltage and generate a bottom detection signal asserted when the voltage of the one end of the auxiliary winding becomes lower than the threshold voltage; and a logic part configured to assert the on signal (i) when the bottom detection signal is asserted after lapse of certain set mask time after the switching transistor is turned off, (ii) when a predetermined first time-out period elapses after the switching transistor is turned off, or (iii) when a state where the bottom detection signal is not asserted lasts for a second time-out period shorter than the first time-out period after the bottom detection signal is asserted.

16. A control circuit of a DC/DC converter including a transformer having a primary winding and an auxiliary winding provided at a primary side and a secondary winding provided at a secondary side, a switching transistor connected to the primary winding, and a detection resistor provided on a path of the switching transistor, the control circuit comprising:

a pulse modulator configured to generate a pulse signal having a duty cycle adjusted such that an output voltage of the DC/DC converter approaches a target value, based on a detection voltage across the detection resistor and a feedback voltage depending on the output voltage of the DC/DC converter; and a driver configured to switch the switching transistor based on the pulse signal, wherein the pulse modulator includes:

an off signal generator configured to generate an off signal asserted depending on the feedback voltage and the detection voltage; and an on signal generator asserted depending on a voltage of one end of the auxiliary winding, wherein the pulse modulator is configured to generate the pulse signal which is shifted to an on level corresponding to turning-on of the switching transistor when the on signal is asserted and is shifted to an off level corresponding to turning-off of the switching transistor when the off signal is asserted, and wherein the on signal generator includes:

a bottom detection comparator configured to compare the voltage of the one end of the auxiliary winding with a predetermined threshold voltage and generate a bottom detection signal asserted when the voltage of the one end of the auxiliary winding becomes lower than the threshold voltage; and a logic part configured to assert the on signal (i) when the bottom detection signal is asserted by the predetermined number of times, (ii) when a predetermined first time-out period elapses after the switching transistor is turned off, or (iii) when a state where the bottom detection signal is not asserted lasts for a second time-out period shorter than the first time-out period after the bottom detection signal is asserted.

17. A control method of a DC/DC converter including a transformer having a primary winding and an auxiliary winding provided at a primary side and a secondary winding provided at a secondary side, a switching transistor connected to the primary winding, and a detection resistor provided on a path of the switching transistor, the control method comprising:

comparing a voltage of one end of the auxiliary winding with a predetermined threshold voltage and generating a bottom detection signal asserted when the voltage of the one end of the auxiliary winding becomes lower than the threshold voltage;

asserting an on signal (i) when the bottom detection signal is asserted after lapse of certain set mask time after the switching transistor is turned off, (ii) when a predetermined first time-out period elapses after the switching transistor is turned off, or (iii) when a state where the bottom detection signal is not asserted lasts for a second time-out period shorter than the first time-out period after the bottom detection signal is asserted;

generating an off signal asserted based on a detection voltage across the detection resistor and a feedback voltage depending on an output voltage of the DC/DC converter;

generating a pulse signal which is shifted to an on level corresponding to turning-on of the switching transistor when the on signal is asserted and is shifted to an off level corresponding to turning-off of the switching transistor when the off signal is asserted; and driving the switching transistor based on the pulse signal.

18. A control method of a DC/DC converter including a transformer having a primary winding and an auxiliary winding provided at a primary side and a secondary winding provided at a secondary side, a switching transistor connected to the primary winding, and a detection resistor provided on a path of the switching transistor, the control method comprising:

comparing a voltage of one end of the auxiliary winding with a predetermined threshold voltage and generating a bottom detection signal asserted when the voltage of the one end of the auxiliary winding becomes lower than the threshold voltage;

asserting an on signal (i) when the bottom detection signal is asserted by the predetermined number of times, (ii) when a predetermined first time-out period elapses after the switching transistor is turned off, or (iii) when a state where the bottom detection signal is not asserted lasts for a second time-out period shorter than the first time-out period after the bottom detection signal is asserted;

generating an off signal asserted based on a detection voltage across the detection resistor and a feedback voltage depending on an output voltage of the DC/DC converter;

generating a pulse signal which is shifted to an on level corresponding to turning-on of the switching transistor when the on signal is asserted and is shifted to an off level corresponding to turning-off of the switching transistor when the off signal is asserted; and driving the switching transistor based on the pulse signal.

* * * * *